March 26, 1963 E. VOLK 3,082,941
PUNCHED DATA TRANSFER MACHINE
Filed Oct. 23, 1961 4 Sheets-Sheet 1

INVENTOR
EUGENE VOLK
ATTORNEY

March 26, 1963     E. VOLK     3,082,941
PUNCHED DATA TRANSFER MACHINE
Filed Oct. 23, 1961     4 Sheets-Sheet 2
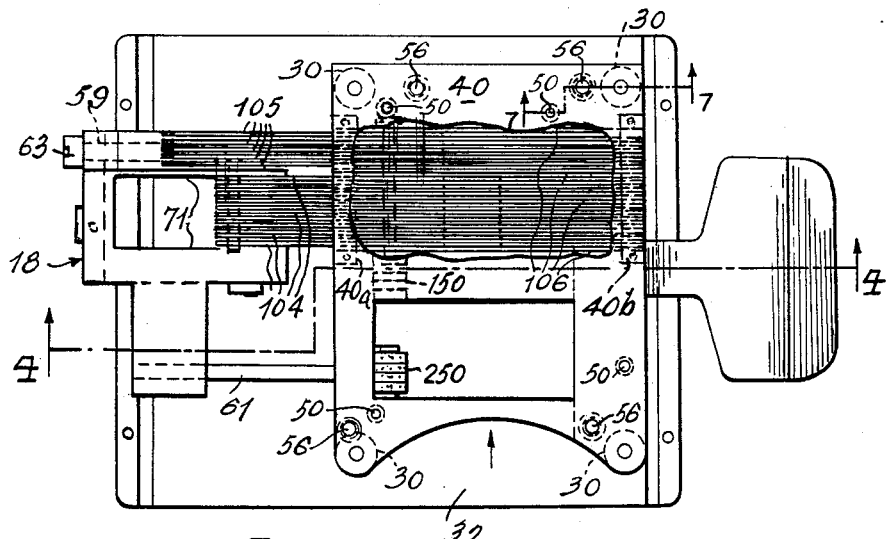
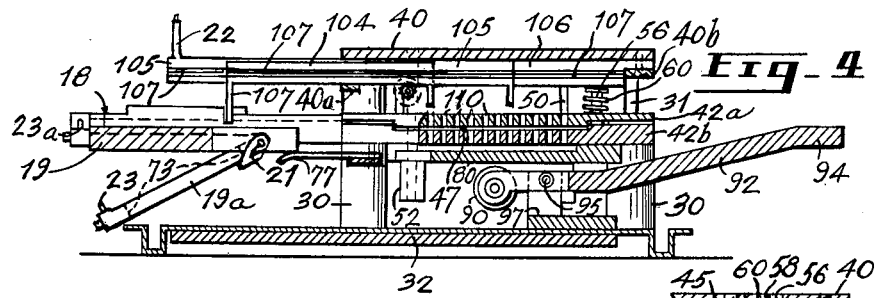
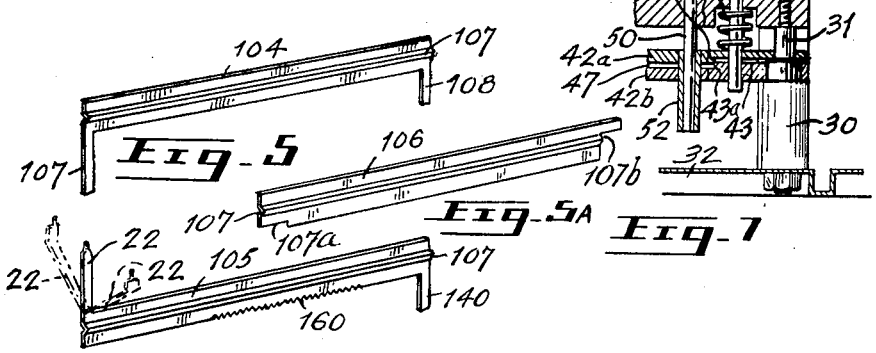
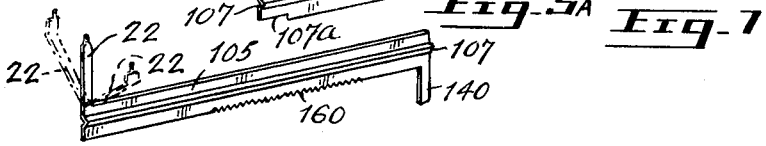
INVENTOR
EUGENE VOLK
ATTORNEY March 26, 1963
E. VOLK
3,082,941
PUNCHED DATA TRANSFER MACHINE
Filed Oct. 23, 1961
4 Sheets-Sheet 3
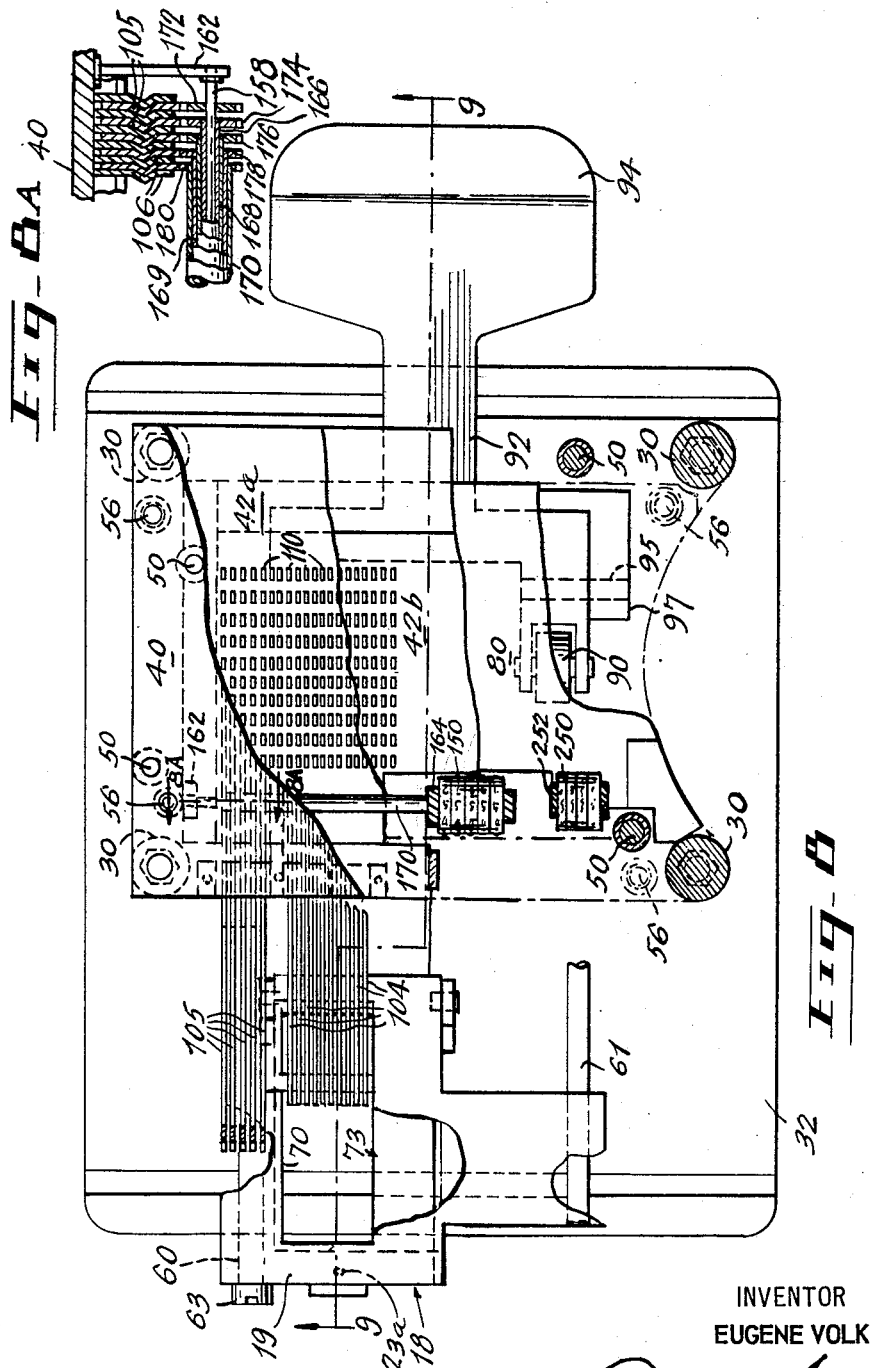
INVENTOR
EUGENE VOLK
ATTORNEY

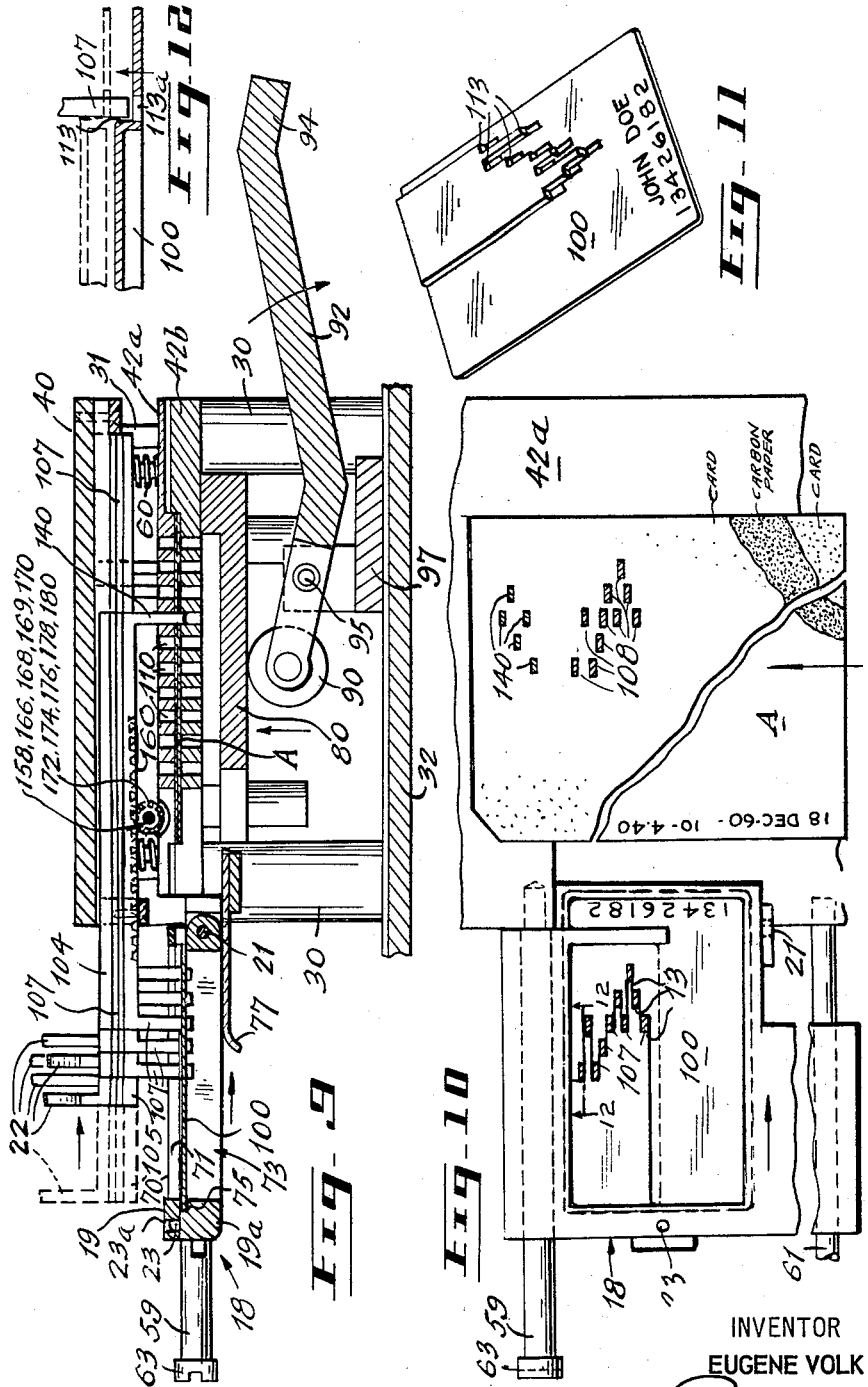

United States Patent Office 3,082,941
Patented Mar. 26, 1963

3,082,941
PUNCHED DATA TRANSFER MACHINE
Eugene Volk, 5190 Walkley Ave., Apt. 4,
Montreal, Quebec, Canada
Filed Oct. 23, 1961, Ser. No. 146,977
9 Claims. (Cl. 234—35)

The present invention relates to the manufacture of data punching machines and more specifically to the manufacture of a compact manually-operable data punching machine particularly suited for the recording of credit card numbers and sales of gas, oil or the like in service stations.

It has become a common practice for most gasoline and oil distributing companies to issue credit cards for the convenience of their customers which are handed to the attendant at the various gas stations to record their purchases. Each of these credit cards is given an identifying code number which is recorded on each bill and which serves to identify the account when periodical statements are sent out to the cutomer. To expedite the making of the bills at the time of sale some of the credit cards now being issued are provided with embossed or raised lettering giving the customer's name and credit number and these are utilized in recording machines to print this data directly on the bill. However, the amount of gas, oil, etc., sold must be written on together with the amount of the sale.

Further, in most cases the billing at the head office of most of these companies is accomplished by punched data processing machines so that when the bills from any one customer are to be processed the written data quantities, amount of sale, etc., must be punched into the customer's account card.

The present invention aims to provide a manually operable data punching machine that is capable of punching a series of code perforations directly into the sales slip or counter check at the individual gas stations which will indicate the customer's credit card number and amount of sale in a form whereby it can be directly translated by the accounting apparatus at a head office for the purpose of making out customers' accounts.

This is accomplished in accordance with the present invention by providing a machine construction which includes in combination with an arrangement of sliding punches and a reciprocal die plate, means whereby certain of the punches are moved into the desired punching alignment by the engagement of raised portions or abutments formed on the customer's credit card. These are arranged so as to correspond with the customer's credit card number and other master data so that entry of the card, supported on a sliding card carriage, within the machine moves a plurality of the punch supporting slides in a corresponding alignment. Others of the punch supporting slides include extensions which protrude exteriorly of the machine housing to constitute manually operable levers so that the amount of sale can be quickly and easily set up for punching with the credit card data. The bill or voucher which is to receive this data is inserted into the machine along a suitable guide which places it between a split die plate disposed below the punches. By means of a manually operable lever, the die plate and inserted bill are raised upwards into engagement with data recording punches set by the customer's control and operator's manual operation.

In one preferred construction means in the form of printing or embossing rolls are also provided to give a visual record of date, sale, etc., on the sales bill or voucher. The printing rolls, for the amount of sale, are connected with the punch locating slides so as to be automatically set to correspond with the data recording punches indicating sales on each operation.

Having thus generally described the nature of the invention particular reference will be made to the accompanying drawings showing by way of illustration a preferred embodiment thereof, and in which:

FIGURE 2a is a cross-sectional view of the construction of FIGURE 1 along the line 2a—2a.

FIGURE 3 is a top plan view of the construction shown in FIGURE 1 with the cover removed for clarity.

FIGURE 4 is a sectional view of FIGURE 3 along the line 4—4.

FIGURE 5 is an enlarged detail view of a punch supporting slide of the type actuated by the control card.

FIGURE 5a is an enlarged detail view of a punch guiding and spacing plate.

FIGURE 6 is an enlarged detail view of a punch supporting slide of the type manually actuated exteriorly of the machine by the operator.

FIGURE 7 is a cross-sectional view of FIGURE 3 along the line 7—7 showing the construction of the supplementary guide pins.

FIGURE 8 is a plan view of the construction as shown in FIGURE 3 with portions of the punch supporting slides, punch supporting plate, top and bottom die plate, and pressure plate broken away to show the relationship of the various elements.

FIGURE 8a is a vertical cross-section of the construction shown in FIGURE 8 along the line 8a—8a to show the driving gear arrangement between the manually actuated punches and the printing rolls in more detail.

FIGURE 9 is a vertical cross-sectional view of the construction shown in FIGURE 8 along the line 9—9.

FIGURE 10 is an enlarged somewhat diagrammatic view in plan of the control card supporting slide or carriage with a credit card in accordance with the invention being shown in operative location and also showing a sales voucher or bill in punch receiving position as being punched and printed with the necessary recording data.

FIGURE 11 is a view in perspective elevation of a credit card having perforations and punch aligning abutments in accordance with the invention.

FIGURE 12 is an enlarged sectional view of the credit card construction shown in FIGURE 10 along the line 12—12 to show the engagement of a typical card abutment or projection with the locating extension of a punch supporting slide.

Figure 1:
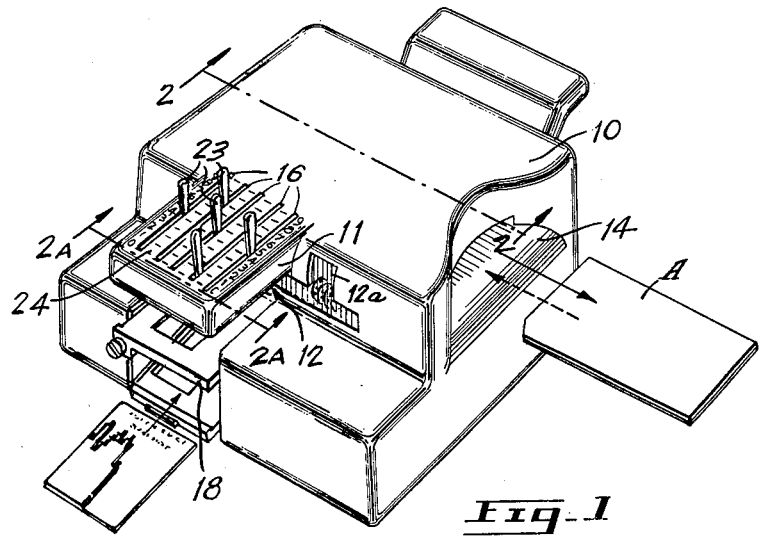
FIGURE 1 is a view in perspective elevation of a data punching machine according to the invention.

With particular reference to FIGURE 1 of the drawings, a data processing machine in accordance with the invention is shown as it would appear in operative condition. The working elements of the machine are contained within a cover or housing 10 which is provided with access openings 12 and 14 and, an extended top portion 11 provided with a series of parallel slots 16. The access opening 12 accommodates the passage of a sliding tray or carriage 18 which supports the customer's card for insertion in the machine and the access opening 14 permits the entry of a bill or voucher "A" to receive the data punchings. The series of slots 16 are to accommodate extended portions 22 of a corresponding series of punch supporting slides, as will be described later, with each portion 22 being provided with a handle 23 for manual actuation. An index plate 24 is mounted on the top of the cover portion 11 to surround the series of slots 16 and is provided with suitable indicia so as to give a visual indication for the location of the punch locating handles 23.

Figure 2:
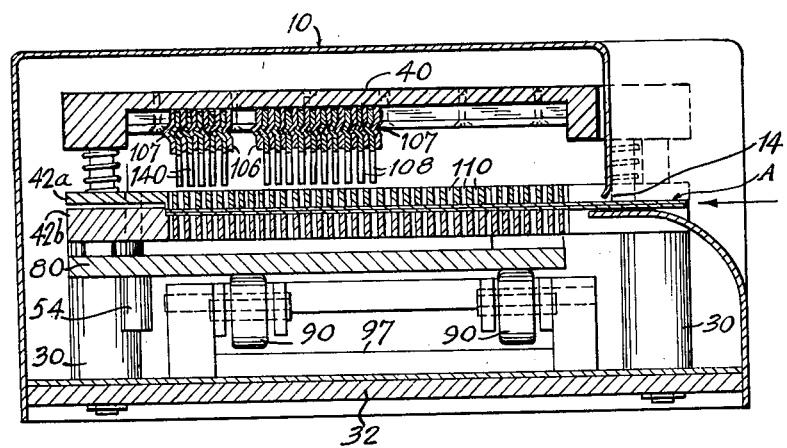
FIGURE 2 is a cross-sectional view of the construction of FIGURE 1 along the line 2—2.
Figure 2A:
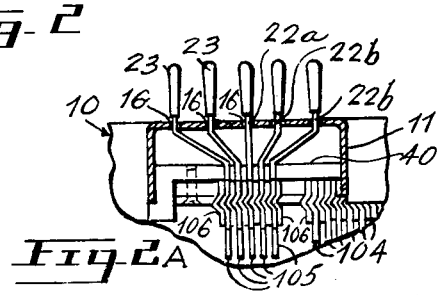

In order to more fully describe the construction of the machine, reference is made to FIGURES 2 and 2a showing a cross section of the construction of FIGURE 1 and FIGURE 4 showing a cross section of FIGURE 2 with the housing 10 removed. As shown most clearly in FIGURE 4, the working elements of the machine are mounted on four main supporting standards or pins 30 extending upwardly from a base plate 32. There are two main elements to the punching portion of the machine, namely a punch supporting assembly having a main plate 40 that is mounted on reduced diameter upper portions 31 of the pins 30 in fixed spaced relationship from the base plate 32, and a split punch guide and die plate having a top portion 42a and a lower portion 42b. The die plate portions 42a, 42b are also mounted on the portions 31 of the pins 30 but in this case for sliding reciprocal movement towards and away from the punch supporting plate 40. In addition to the portions 31 of the pins 30 the die plate portions 42a, 42b and the punch supporting plate 40 are also maintained in positive alignment by the engagement of four (4) pins 50 extending from the punch supporting plate 40 with a first set (4) of bushings 52 mounted on the top die plate 42a and the sliding fitment of the bushings 52 with the lower die plate 42b. As a still further alignment guide and a resilient shock-absorbing means between the die plates and punch supporting plate the punch plate 40 is provided with four (4) pins 56 which pass through suitable openings 58 provided in the respective die plates. As shown in FIGURE 7, the punch plate 40 is countersunk on its lower surface about each of the pins 56 so as to accommodate a coil spring 60 mounted on each pin 56 between the punch plate 40 and the top die plate 42a.

The top surface 43 of the bottom die plate 42b is recessed as indicated at 43a and the top die plate 42a has a corresponding projection 45. The dimensions of the recess 43a and the spacing between the die plates 42a, 42b are such as to provide a guiding entry slot 47 for the bill "A" which is in alignment with the recess 14 in the cover 10.

A pair of shafts 59, 61 are mounted at one end to the lower die plate 42b so as to extend outwardly therefrom in spaced parallel relationship to provide a guide and support for the card-supporting slide or carriage 18. The carriage or slide 18 is provided on its upper surface plate 19 with a bordering flange portion 70 framing an opening 71 to accommodate the customer's credit card or plate indicated at 100. In accordance with the present invention this card 100 is of a special formation and is utilized to select and arrange certain of the punching elements, as will be described in more detail later. The card 100 is supported against the plate 19 by a hingedly connected lower plate 19a, the lower plate 19a is connected to the top plate 19 by exterior hinge members 21 located at each side of the inner ends of the plates 19, 19a. The lower plate 19a is also provided with an opening 73 corresponding to the opening 71 in the plate 19 and the upper surface of the plate 19a bordering the opening 73 is raised as indicated at 75 to provide a means of positively locating the card 100.

With this arrangement, the entire carriage 18, which is mounted for parallel sliding movement on the spaced apart shafts 59, 61 is normally pulled out for loading to the terminal end 63 of the shaft 59, which acts as a stop. The lower plate 19a, by its hinged attachment, is then in card receiving position, as shown in FIGURE 4. The card 100 is placed in the lower plate in register and the plate 19a raised towards the plate 19 to hold the card firmly in place. The overlapping frame or flange 70 on the plate 19 and the corresponding portions of the plate 19a hold the card 100 flatly along the outer margins which is important if the card or plate 100 be made of a flexible material, such as plastic or the like.

The carriage 18 is then pushed into punching position along the shafts 59, 61. At the same time the plate 19a comes into sliding engagement with a guide plate 77 extending from the face of the machine so that it is firmly retained in alignment with and against the plate 19. Locating pins 23 provided on the plate 19a and corresponding openings 23a on the plate 19 also act to maintain the card supporting plates in alignment.

For the operation of the punching mechanism a pressure plate 80 is mounted between the supporting pins 30 and directly beneath the lower die plate 42b so as to be engaged by the contacting rollers 90 of an actuating lever 92, the other end of which extends externally of the housing 10 and is shaped as indicated at 94 to provide an actuating handle. The lever 92 is pivotally mounted as indicated at 95 to a bearing support 97 mounted on the base 10 so that pressure applied to the handle 94 brings the rollers 90 against the pressure plate 80 and raises both die plates 42a, 42b and the supported card slide assembly 18 towards the punch plate supporting plate 40.

As is seen most clearly in FIGURES 4 and 9, the punch plate 40 is provided on the bottom surface with a pair of punch supporting plates 40a, 40b which extend across the plate in spaced relationship therewith. These plates 40a, 40b act to support and retain a plurality of punch supporting slide plates 104, 105 and spacers and guides 106. The slides 104, 105 and guides 106 are all of elongated rectangular outline and shaped so as each to have a longitudinal extending locating crimp or offset 107.

Dealing first of all with the punch supporting slides 104, see FIGURE 5, these are each provided with a first projecting portion 107 which acts as a contact member for the movement of the slide, and a second projecting portion 108 which is shaped to constitute a perforating punch fitting within the die cavities 110 of the upper and lower die plates 42a, 42b. As is shown most clearly in FIGURE 9, the portions 107 of the slides 104 are located above the card-supporting slide 18 so that they are inside of the opening 71 surrounded by the outstanding flange 70 and are contacted by the flange portion 70a when the slide 18 is pulled out to the limit of its travel so as to align all the slides in a non-punching position clear of the die plates 42a, 42b, as shown in FIGURE 4. The slide plates 104 and 105 are supported for the necessary sliding movement and are aligned and accurately spaced apart by the spacing guides or plates 106. As shown in FIGURE 5a each plate 106 is provided with a notch 107a at the front end and a deeper notch 107b at the rear end to accommodate the supporting plates 40a, 40b. With this arrangement the desired number of punch supporting slide plates 104 and 105 are assembled with the guide plates intervening with the offsets 107 fitting one into the other so that the slides 104, 105 are capable of sliding inward or outward between the plates 106. When the desired assembly is made up the guide plates 106 are secured to the punch plate 40 by the engagement of the supporting plates 40a, 40b with respective plate notches 107a, 107b. It will be understood that any desired number of plates 106 can be placed between any adjacent pair of slides 104, 105 to give the correct spacing to correspond with the die cavities 110 of the upper and lower die plates 42a, 42b. In the preferred construction the thickness of the guide plates 106 is such that a single plate 106 between each pair of slides 104, 105 corresponds to the sequented spacing between the die cavities 110 but if it is desired to space the slides 104, 105 apart to correspond with, say for example, every second set of die cavities 110, this is readily accomplished by inserting additional guide plates 106.

The credit card 100 of the invention, see FIGURE 11, is made so as to have a series of abutments or projections 113 which extend sufficiently above the surface of the card to contact the contact portions 107 of the slides 104 when the card 100 is placed on the slide 18 and located in position as described. The abutments 113 are made in the card by punching, embossing, or moulding, depending on the material of the card, with each abutment disposed relative to the length of the card in a location determined by the code number of the card. For example, if the code numbers are 1, 2, 3, 4 the abutments 113 would be in progressive order, as shown in FIGURE 10. Directly in advance of each abutment 113 there is provided a perforation 113a which accommodates the contact portions 107 of the punch supporting slide during the punching operation as a further means of ensuring an accurate alignment and registration.

With this arrangement, the customer's card is placed on the slide 18 and the entire slide pushed into the machine, as previously described and shown in FIGURE 9. The abutments 113 on the card, by engagement with the respective punch slide portions 107, act to move the slides 104 along and between the punch guide plates 106 so that they come into alignment with the respective die openings in the die plates 42a, 42b. The bill or voucher "A" is then inserted in the machine as it is ready to punch the customer's credit card number and any other desired master data.

The punch supporting slides 105, see FIGURE 6, are each provided with a first lower projecting extension or arm 140 which constitutes a perforating punch while a further upper projecting portion 22 at the opposite end of the slide 105 constitutes a manually operable member provided with a handle 23 as previously described. In order that the punch slide portions 22 can properly extend through the slots 16 in the housing 10, there being five (5) punch supporting slides 105 shown in the present drawings, they are angularly offset at each side from the central one of the group, as shown in FIGURE 2a for example. That is, the extension 22a extends straight up and the extensions 22b at each side are angularly offset accordingly, see also FIGURE 6.

In the preferred construction shown, means in the form of printing or embossing rolls 150 are mounted beneath the punch supporting plate 40 so as to impress a printed registration on the bill or voucher "A" corresponding to the punched data made by the punch supporting slides 105. Each of the rolls 150 bears indicia corresponding to the indicia on the index plate 24 so that the location of the respective punch slide extension 22 controls the particular indicia of the corresponding roll 150 that is aligned in registering position.

The movement of the punch supporting slides 105 is transmitted to the rolls 150 by the arrangement shown in FIGURES 8 and 8a. As shown most clearly in FIGURE 6, the lower edge of a portion of each punch supporting slide 105 is shaped to provide a toothed rack portion 160. A system of gears is mounted on telescoping shafts beneath the punch supporting slides 105 and these shafts extend across all punch supporting slides 105, 104 to a location in alignment with the printing rolls 150. Specifically, an inner shaft 58 extends between a standard 162 and an angular bracket 164 so as to support for rotation sleeve shafts 166, 168, 169, 170 to which at one end are connected a first series of gears 172, 174, 176, 178, 180 and at the other end engaging directly with the respective printing rolls 150a, 150b, 150c, 150d, 150e. The amount of teeth on the racks 160 is selected together with the pitch of teeth on the respective gears 172, 174, 176, 178, 180 so that movement of the punch supporting slide 105 between one number and the next is transmitted as a partial rotation of the respective roll 150 bringing the next number in impressing position.

In order to provide a means of dating the voucher or sales slip "A" a further series of dating rolls 250 is also mounted beneath the punch plate 60 for selective manual rotation between supports 252. The die plates 42a, 42b are suitably cut out to expose the portion of the voucher "A" adapted to receive the impressions from the rolls 150, 250. As the voucher or sales slips "A" normally used for the purpose described include integral carbons a clear impression is obtained without the necessity of ink rollers or the like. If it is desired to print the data on sales slips without carbon the usual inking arrangements are provided.

As shown most clearly in FIGURE 1 the access opening 12 in the cover 10 includes a portion 12a through which the dating rollers 250 may be adjusted.

In operation, as previously described, with the slide 18 pushed into the machine and through the card 100 setting the punch slides 104 to punch the customer's credit number, and presuming that the voucher "A" is in place as also described; the amount of sale and/or quantity of gas or oil for example is set up by the handles 23 so that the punch slides 105 are also positioned in the correct position. The handle 94 is then pressed down raising the die plate portions 42a, 42b with the voucher "A" therebetween into contact with the selected punches so as to punch the required data. As the slide or carriage 18 is also raised the punch support extensions 107 pass through the perforations in the card 100 acting as a further alignment check. The printing rollers 150 and 250 are now in contact with the voucher "A" and the selected indicia which is accordingly registered on the voucher.

Release of the handle 94 strips the punches and the punch support portions 107 from the voucher "A" and credit card, respectively, and the voucher can be withdrawn. The slide 18 is pulled out of the machine and the card 100 returned to the customer. As will be apparent, the entire operation of recording customer's credit number, sale, date, etc. on the sales slip or voucher can be performed in a matter of minutes and the resultant record is in a form immediately suitable for sorting and account processing by known automatic machines without the necessity of further punching operations.

It will be understood that the present apparatus described and illustrated is flexible with respect to the number of punch supporting slides 105, 104 which may be utilized. The die matrix on the plates 42a, 42b shown provides accommodation for more than the number of punch supporting slides 105, 104 shown so as to be in a position to receive extra punch supporting slides if more data is required. For example, there are some twenty (20) rows of punch guiding and die openings shown in the plates 42a, 42b while there are only five punch supporting slides 105 and ten punch supporting slides 104 utilized.

I claim:

1. A portable data punching machine comprising in combination a housing, a supporting frame mounted within said housing, a plurality of perforating punches mounted for sliding reciprocal movement on said supporting frame in spaced parallel alignment with one another and in a substantially horizontal plane, a perforated die plate mounted on said supporting frame for reciprocal vertical movement towards and away from said perforating punches, die plate actuating means disposed beneath said reciprocal die plate including a portion extending exteriorly of said housing, a central card supporting carriage mounted on said supporting frame for sliding movement at least partially into and out of said housing in the plane of said die plate and also for reciprocal movement relative to said perforating punches in conjunction with said die plate, said housing having a first access opening adapted to accommodate passage of said control card supporting carriage and a second access opening disposed in alignment with said die plate and adapted to accommodate entry of a data receiving blank, certain of said perforating punches having extensions disposed in the path of said card supporting carriage whereby sliding movement of said carriage within said housing is adapted to bring outstanding portions of a control card supported thereby into engagement with said punch extensions and by said engagement selectively place said punches in aligned register with corresponding die openings in said die plate and actuation of said die plate is adapted to bring a data receiving blank into data recording contact with said punches.

2. A portable data punching machine as claimed in claim 1, wherein each of said punch supporting slides is provided with a longitudinally extending groove on one side surface and a corresponding outstanding bead on the opposite side surface, said slides being supported on said supporting frame by sliding engagement with a plurality of intervening slide supporting spring plates each having corresponding grooves and beads.

3. A portable data punching machine comprising in combination, a housing, a supporting frame mounted within said housing, a plurality of punch supporting slides mounted on said supporting frame for reciprocal sliding movement in spaced parallel relationship relative to each other, each of said supporting slides having a first extension adapted on engagement to cause controlled sliding movement of said slide and a second extension constituting a perforating punch, a perforated die plate mounted in said supporting frame for reciprocal vertical movement towards and away from said punch supporting slides, die plate actuating means disposed beneath said reciprocal die plate including a portion extending exteriorly of said housing, a control card supporting carriage mounted on said supporting frame for sliding movement at least partially into and out of said housing on the plane of said die plate and also for reciprocal movement relative to said punch supporting slides in conjunction with said die plate, said housing having a first access opening adapted to accommodate passage of said control card supporting carriage and a second access opening disposed in alignment with said die plate and adapted to accommodate entry of a data receiving blank, said punch supporting slides first extensions being disposed in the path of and adapted for engagement by outstanding abutment portions on the face of a control card mounted on said supporting carriage when said carriage is moved inwardly of said housing.

4. A portable data punching machine as claimed in claim 3, wherein each of said punch supporting slides is provided with a longitudinally extending groove on one side surface and a corresponding outstanding bead on the opposite side surface, said slides being supported on said supporting frame by sliding engagement with a plurality of intervening slide supporting spring plates each having corresponding grooves and beads.

5. A portable data punching machine comprising in combination a housing, a supporting frame mounted within said housing, a plurality of punch supporting slides mounted on said supporting frame for reciprocal sliding movement in spaced parallel relationship relative to each other, each of said punch supporting slides having a first extension adapted on engagement to cause sliding movement of said respective slide and a second extension constituting a perforating punch, a perforated die plate mounted on said supporting frame for reciprocal vertical movement towards and away from said punch supporting slides, lever means mounted on said supporting frame beneath said die plate and operating means extending exteriorly of said housing adapted to actuate said lever means, a control card supporting carriage mounted on said supporting frame for sliding movement at least partially into and out of said housing on the plane of said perforated die plate and also for reciprocal movement relative to said punch supporting slides in conjunction with said die plate, said housing having a first access opening adapted to accommodate passage of said control card supporting slide and a second access opening disposed in alignment with said perforated die plate and adapted to accommodate entry of a data receiving blank and a plurality of elongated slots adapted to accommodate certain of said punch supporting slides first extensions, with others of said first punch supporting slide extensions being disposed in the path of and adapted for engagement by outstanding abutment portions of a control card mounted on said supporting carriage when said carriage is moved inwardly of said housing.

6. A portable data punching machine as claimed in claim 5, wherein each of said punch supporting slides is provided with a longitudinally extending groove on one side surface and a corresponding outstanding bead on the opposite side surface, said slides being supported on said supporting frame by sliding engagement with a plurality of intervening slide supporting spacing plates, each having corresponding grooves and beads.

7. A portable data punching machine as claimed in claim 5, wherein the said first extensions of said punch supporting slides extending through said housing slides extend upwardly from one end of each of said slides with the second extension constituting a perforating punch extending downwardly from the opposite end.

8. A portable data punching machine as claimed in claim 5, wherein the said first extensions of said punch supporting slides other than those extending through said housing slots extend downwardly from one end of each of said slides with the second extension constituting a perforating punch extending in the same direction.

9. A portable data punching machine as claimed in claim 5, wherein each of said punch supporting slides having said first extensions extending through said housing slots are provided with a toothed rack along the lower marginal edge, each of said toothed racks being in meshed engagement with a driving gear, said driving gears being connected to one end of each of a plurality of driving shafts, said driving shafts extending from beneath said punch supporting slides to a connection with individual ones of a plurality of printing rolls mounted for rotation on said supporting frame, whereby sliding movement of any selected one of said punch supporting slides is transmitted to cause rotation of the connected corresponding printing roll.

References Cited in the file of this patent
UNITED STATES PATENTS

| | | |
|---|---|---|
| 2,768,691 | Cooper et al. | Oct. 30, 1956 |
| 2,964,239 | Whitson | Dec. 13, 1960 |
| 3,008,632 | Grady | Nov. 14, 1961 |
| 3,008,634 | Pennington | Nov. 14, 1961 |